June 16, 1964 W. B. MEINDERS 3,137,468
CABLE TRAY CURVE SECTION
Filed Jan. 8, 1963 2 Sheets-Sheet 1

INVENTOR.
WILLIAM B. MEINDERS
BY
ATTORNEY

June 16, 1964 W. B. MEINDERS 3,137,468
CABLE TRAY CURVE SECTION
Filed Jan. 8, 1963 2 Sheets-Sheet 2

INVENTOR.
WILLIAM B. MEINDERS
BY Howard A. Reuter
ATTORNEY

United States Patent Office 3,137,468
Patented June 16, 1964

3,137,468
CABLE TRAY CURVE SECTION
William B. Meinders, Cincinnati, Ohio, assignor to Burndy Corporation, a corporation of New York
Filed Jan. 8, 1963, Ser. No. 250,111
7 Claims. (Cl. 248—49)

This invention relates to cable tray curve units for connection between a pair of horizontally disposed, straight, but nonparallel cable tray sections to form a continuous cable tray system.

In United States Patent 3,022,972, issued to R. F. E. Bunston, there is disclosed a novel cable and pipe supporting trough or tray structure of the type which is extensively used in power stations and large industrial plants to support a plurality of cables or wires for the transmission of electrical energy, and to support piping or tubing used in the transmission of fluids both liquid and gaseous. The novel trough therein described is characterized by a bottom, or floor structure, in the form of a corrugated sheet having parallel spaced apart corrugations which are adapted to be disposed transversely of the longitudinal axis of a cable trough into which the floor is assembled. The corrugations form a plurality of spaced apart upper and lower horizontal elements which are alternately interconnected along their transverse edges by pairs of vertical side wall elements. The lower horizontal elements of the structure include a plurality of spaced apart perforations to permit air circulation around the cable or tubing supported in the trough, and to lighten the overall weight of the assembled unit. The upper horizontal elements of the floor form, with the attached vertical side walls, a beam structure of maximum strength for supporting the tubing or cable within the trough, and for maintaining the tubing in vertically spaced relation to the air circulating perforations in the lower elements. To derive maximum advantage from the air circulating characteristics of this floor structure, it is thus necessary to particularly distinguish between the top and bottom surfaces of the floor and to avoid top to bottom inversion of the floor pieces during assembly.

An assembled cable supporting trough constructed in accordance with Patent 3,022,972 comprises a pair of longitudinally extending, spaced apart side rails having a corrugated floor supported transversely between them. Each of the side rails includes a vertical portion and a lower, horizontally extending lip portion, and the ends of the lower horizontal floor elements rest on and fastened to the rail lips to form an integral trough-shaped structure.

The practical installation of cable trough systems frequently requires the interconnection of substantially coplanar but nonparallel straight trough units by means of an angular trough unit to provide a smooth, uninterrupted change in the axial direction of the system. Patent 3,022,972 disclosed how such angular curve units may be formed of specially-formed floor sections which tend to be costly and difficult to obtain. Another possible method of constructing curve units is the cutting of pie-shaped wedge sections from pieces of standard straight floor-structure stock. This method, however, has been found to result in considerable waste of floor material caused by trimming rectangular pieces of straight stock to form substantially symmetrical wedge sections, and in addition involves considerable expense in the numerous cutting and trimming operations required.

In cable trough systems employing floor stock not having necessarily distinguished top and bottom surfaces, it is possible to eliminate some waste by cutting two or more nonsymmetrical wedge sections from a given rectangular piece of floor stock and then inverting a number of the pieces, top-to-bottom. Inverting some of the wedges permits abutting cut edges of equal length to obtain a uniform, substantially symmetrical assembly of angularly connected wedge sections. This particular construction expedient is clearly not readily adaptable for use with the type of trough floor structure having distinct top and bottom surfaces, disclosed in the Patent 3,022,972.

Accordingly, it is a primary object of this invention to provide an inexpensive, simply constructed trough curve unit utilizing straight trough floor stock with a minimum of waste.

This and other objects and advantages of this invention will be made more apparent by reference to the following specification taken in conjunction with the accompanying drawings, in which.

Figure 1:
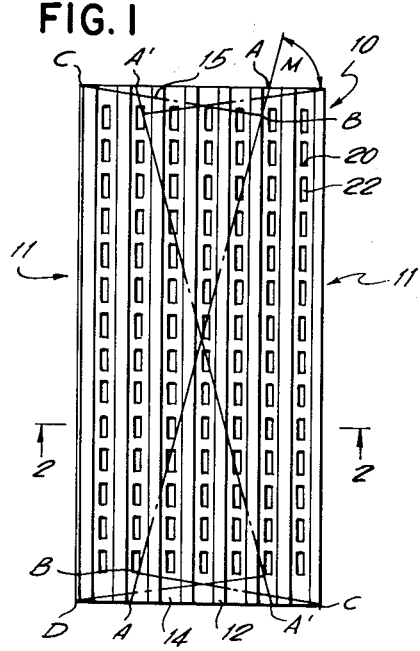
FIGURE 1 is a plan view of a rectangular piece of straight floor stock showing how it is to be shaped in accordance with this invention.
Figure 2:
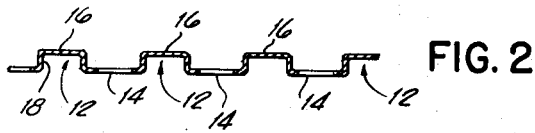
FIGURE 2 is a transverse section view of the floor stock of FIGURE 1 taken in the plane 2—2.

Referring now more particularly to the drawings, FIGURES 1 and 2 illustrate a straight section of corrugated floor stock 10, shaped from a single sheet of metal into the corrugated structure shown, having parallel, spaced apart corrugations 12. The corrugations form a plurality of upper horizontal elements 16 and lower horizontal elements 14, alternate upper and lower elements being interconnected by vertical wall elements 18. The lower horizontal elements include a plurality of apertures 22 separated by a plurality of web sections 20 which maintain the unitary structure of the floor stock. In use, the apertures 20 permit air flow through the floor between the side walls 18.

In cutting and shaping pieces of straight floor stock to form a wedge piece having two angularly positioned transverse edges adapted to be abutted against the transverse terminal edges of two straight trough units, it is desirable to assure that the two edges of the wedge are of the same length as the transverse edges of the straight trough units to which they are to be attached. In particular, in forming a curve unit for joining two straight trough units incorporating the flat floor stock of FIGURE 1, it is to have the transverse terminal edge of the curve section of the same dimension as the transverse terminal edge $\overline{CD}$ of the unmodified straight floor stock.

Figure 3:
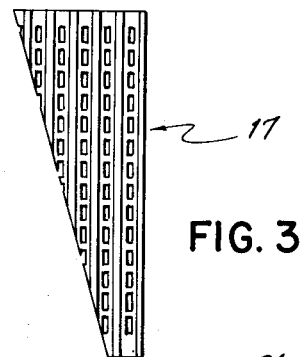
FIGURE 3 is a plan view of a section of floor stock formed in accordance with this invention.

I have found that sections of floor stock suitable for forming a curve unit satisfying the above requirements, may be formed by cutting a first rectangular section of floor stock along the diagonal line A—A as shown in FIGURE 1, to divide the rectangle into two identical, nonsymmetrical wedge sections 11, and by cutting a second rectangular section along the opposite diagonal line A'—A' to form two identical wedge sections 17, one of which is shown in FIGURE 3. The wedge sections 11 and 17 thus produced may be seen to be mirror images of each other. The dissimilar sections 11 and 17 may be utilized without further cutting or trimming to form a wedge assembly having angularly disposed terminal edges of length $\overline{CD}$ by aligning the corresponding transverse cut edges A—A and A'—A' in parallel opposed relation. Thus, for example, if the angle M formed between the line A—A and the longitudinal edge of the rectangular piece is chosen as 75°, and the transverse cut A'—A' is similarly positioned, the sections 11 and 17 will form a wedge assembly having identical equal length terminal edges $\overline{CD}$ positioned at an angle of 30° relative to one another, when assembled as described above.

If it is desired to produce a smoother wedge assembly, having minimum variation of transverse dimension, each wedge such as section 11 may be further trimmed along the line $\overline{CB}$ to produce angular cut edge 15. Cutting away of floor material to form edge 15 shortens the length of cut edge A—A to A—B. The cut away material in the form of the two small triangular sections $\overline{ABC}$ thus represent the total waste material produced by cutting rectangular sections of straight trough floor stock to form curve trough floor units in accordance with this invention.

Figure 4:
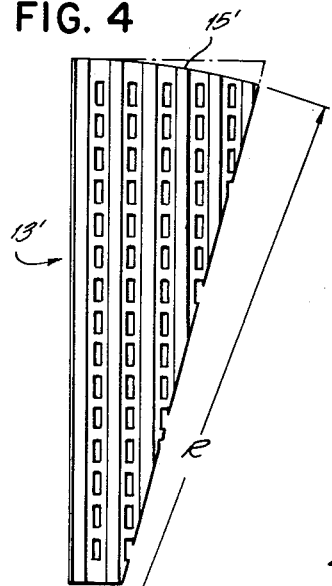
FIGURE 4 is a plan view of a section of floor stock shaped in an alternative form in accordance with this invention.

In an alternative embodiment, the cut edge 15 of a section 11 may be arcuately, rather than linearly shaped, as in edge 15' of wedge section 13 (shown in FIGURE 4). By forming the edge as an arc of a circle having a radius R and a center P lying on a line drawn through the transverse edge $\overline{CD}$, a better mating fit with an arcuately curved side rail, as described subsequently herein, and better assembly and alignment of the wedge sections to the side rails, are achieved.

Three wedge sections 11 and three sections 17, each having the transverse cut edge thereof formed at an angle of 15° to the uncut transverse edge, when positioned in alternating sequence with corresponding cut edges and uncut edges in parallel abutting relationship, form an angular floor structure assembly having uncut terminal edges defining a 90° angle. In an assembled curved trough unit employing a plurality of wedge shaped floor sections positioned in this manner, the sections are supported along the longitudinal edges which extend between the transverse edges, on the lower horizontal support lips 30 of a pair of transversely spaced apart vertical side rails 28. The lower horizontal elements 14 of the floor stock, which rest on the support lips 30 may be fastened thereto in any convenient manner, e.g. by welding, bonding, riveting or screw fastener means to form an integral solid structure.

The arcuately curved side rails 28 may be formed from the standard linear side rails 29 used for straight trough sections, by bending them to the desired radius by any standard well known metal forming process. In the embodiment shown, the inner and outer side rails are illustrated as being formed about a common center having differing radii of curvature, to provide uniform radial spacing between the two over the entire defined arc. If the wedge sections are trimmed as in FIGURE 4 to form the edge 15' on the arc of a circle having the same radius R as the outer trough side rail, alignment of the section during assembly will be facilitated by automatically positioned the cut and uncut transverse edges along radii of the rail in response to abutting the arcuate edge against the arcuate inner surface of the outer rail.

Figure 6:
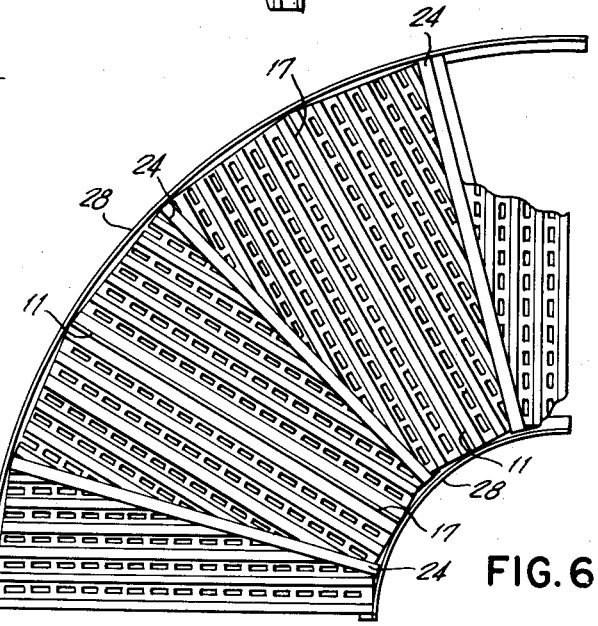
FIGURE 6 is a partially cut away plan view of a 90° curve unit constructed in accordance with this invention.
Figure 5:
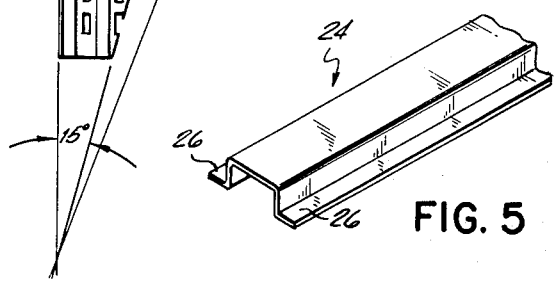
FIGURE 5 is an isometric view of a structural channel member used in constructing a curve trough unit.

Since the transverse corrugations 12 of the floor material are not uniformly radially aligned within the assembled curved trough unit, it is desirable to provide radial beam reinforcement for the assembled trough floor at its potentially weakest spot, i.e. along the cut edges of the wedge sections. For this purpose a beam channel structure 24 (illustrated in FIGURE 5) having outwardly projecting support flanges 26 is provided for positioning transversely between the side rails and between the abutting cut edges of the wedge sections. The flanges 26 lie beneath the bottom surfaces of the two adjacent wedge sections and act as cantilever supports. In the 90° curve section illustrated in FIGURE 6, for example, at least one structural beam such as a corrugation 12 or reinforcing beam 24 is radially positioned every 15° to provide maximum structural rigidity in the complete curve unit.

The vertical side walls 28 may include in addition to the lower horizontal lip 30, a longitudinally extending integral stiffening channel 32, both of which materially assist in resisting deformation of the assembled trough unit in a direction perpendicular to the plane of the trough floor. The terminal ends of the side rails of both straight and curve trough units may be provided with any convenient coupling means, such as the mating hinge units 40 and 42 which are adapted to be interleaved and pinned together by a hinge pin 44, as illustrated in previously cited Patent 3,022,972.

Figure 8:
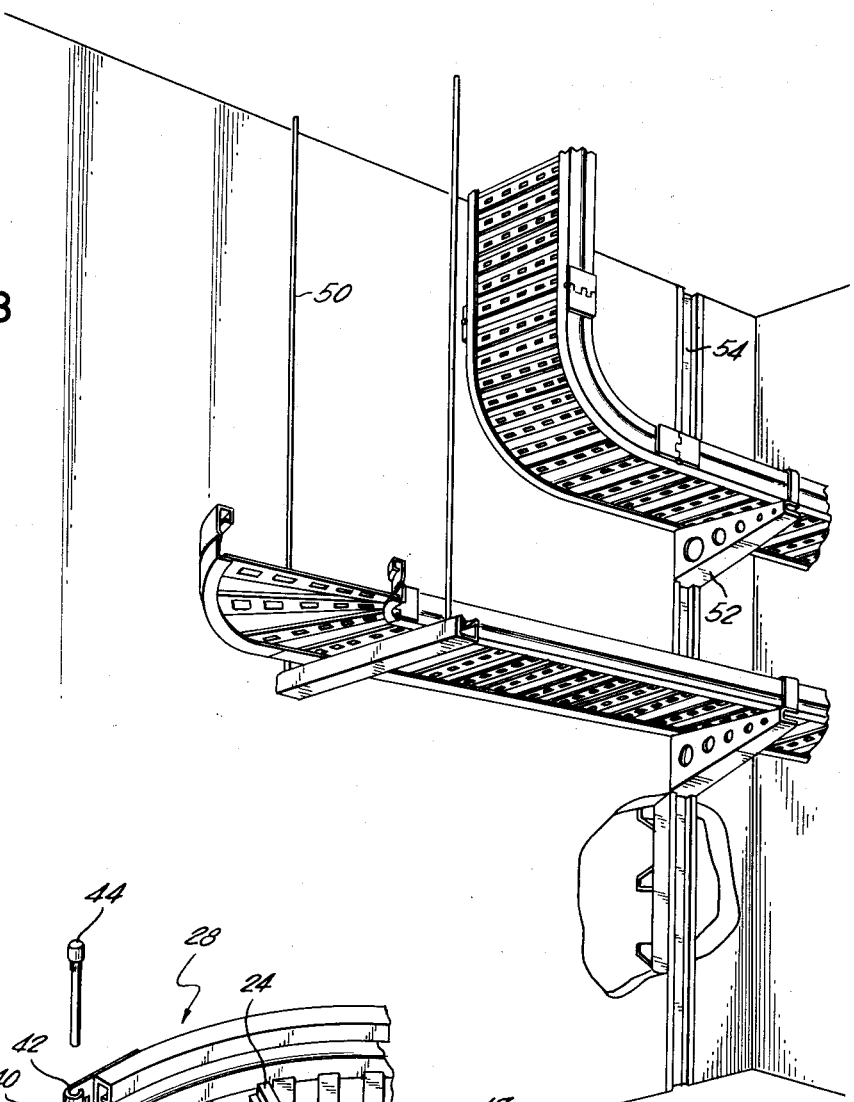
FIGURE 8 is an isometric view of a cable trough system employing the curved section of this invention, shown as it might appear in installed position.
Figure 7:
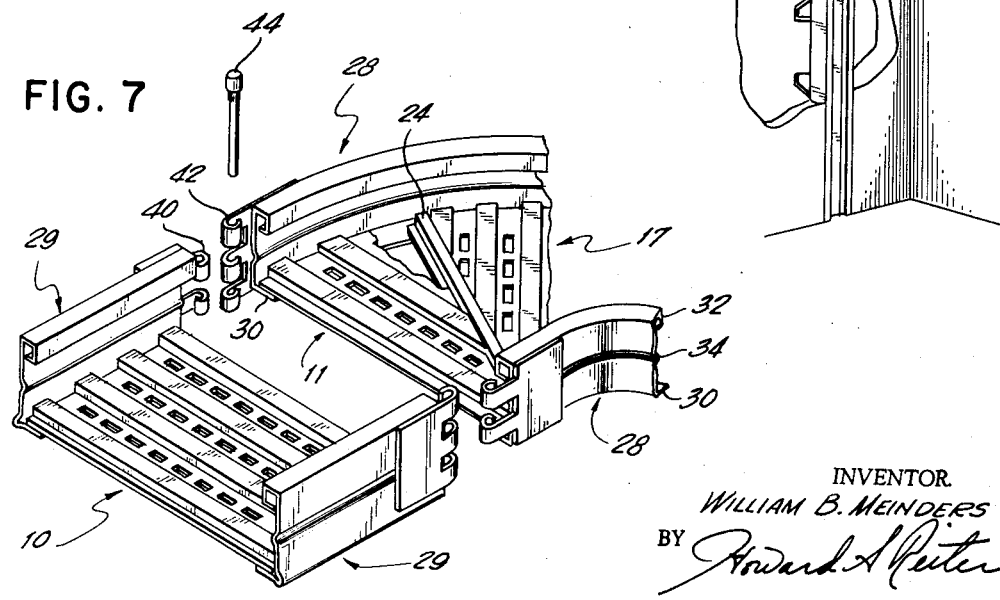
FIGURE 7 is partially cut away isometric view of a curve unit and a straight unit, showing one means for joining the two sections together.

In FIGURE 8, merely for purposes of illustrating how a cable trough system is commonly installed, there are shown horizontally and vertically curving cable troughs supported respectively by a hanger fixture 50 of the trapeze type and by a cantilever arm 52 which is supported by, and adjustable within a vertical track 54, in a well known manner.

The invention has thus been described but it is desired to be understood that it is not confined to the particular forms or usages shown and described, the same being merely illustrative, and that the invention may be carried out in other ways without departing from the spirit of the invention; therefore, the right is broadly claimed to employ all equivalent instrumentalities coming within the scope of the appendant claims, and by means of which objects of this invention are attained and new results accomplished, as it is obvious that the particular embodiments herein shown and described are only some of the many that can be employed to obtain these objects and accomplish these results.

I claim:

1. A cable trough curve unit, comprising: a pair of substantially arcuately curved, spaced apart side rails, and a floor structure disposed therebetween and fastened thereto; said floor structure being formed of a first wedge-shaped floor section having a top surface and a dissimilar bottom surface and a pair of nonparallel transverse edges, and a second wedge-shaped floor section having the mirror-image shape of said first floor section; wherein said floor sections are disposed transversely between said side rails with their respective top and bottom surfaces in substantially coplanar alignment, and with a pair of corresponding transverse edges in parallel, opposed relationship.

2. The cable trough curve unit of claim 1 wherein said first wedge-shaped floor section is formed by symmetrically cutting a rectangular section of floor material along a first diagonal drawn through a given surface thereof, to form two substantially identically shaped-wedge sections; and wherein said second wedge-shaped section is formed by similarly cutting a substantially identical rectangular section along the opposite diagonal drawn through said given surface.

3. The cable trough curve unit of claim 1 wherein the longer of the two edges of each wedge section which extend between the said nonparallel transverse edges is arcuately shaped to conform to the curvature of the adjacent one of said side rails, to align at least one of said transverse edges with a radius of the rail.

4. The cable trough curve unit of claim 1, further including a transversely extending beam support member positioned between said pair of opposed corresponding edges, and having a pair of longitudinally extending transverse support flanges each underlying a portion of the bottom surface of each adjacent floor section to form a support therefor.

5. The cable trough curve unit of claim 1, wherein said floor sections are formed of corrugated sheet stock having a plurality of parallel spaced apart corrugations forming substantially solid upper surface elements and perforated lower surface elements, and wherein one of said transverse edges on each wedge-section is parallel to said corrugations and the other of said edges is formed at an angle thereto.

6. The cable trough curve unit of claim 5 wherein one angularly formed edge of said first and second floor sections comprise, respectively, said pair of parallel, opposed, corresponding transverse edges.

7. The cable trough curve unit of claim 6 having a floor structure including a plurality of first and second floor sections positioned in alternate sequence, with the transverse edge formed parallel to the corrugations of the corresponding floor section forming the transverse ends of said floor structure, wherein a beam support member having a pair of oppositely extending support flanges is positioned between each pair of opposed, angularly formed transverse edges with each of said flanges underlying a portion of the bottom surface of the adjacent floor sections to form supports therefore.

No references cited.